United States Patent
Jeon

[19]

[11] Patent Number: 6,030,053

[45] Date of Patent: Feb. 29, 2000

[54] AUTOMATIC EMERGENCY BRAKE SYSTEM FOR AUTOMOTIVE VEHICLE

[75] Inventor: Jae-Wook Jeon, Suwon, Rep. of Korea

[73] Assignee: Hyundai Motor Company, Seoul, Rep. of Korea

[21] Appl. No.: 08/967,883

[22] Filed: Nov. 12, 1997

[30] Foreign Application Priority Data

Nov. 14, 1996 [KR] Rep. of Korea .................. P 96-53934

[51] Int. Cl.⁷ .................................................. B60T 13/00
[52] U.S. Cl. ...................... 303/9; 303/114.1; 303/114.3; 188/151 A; 91/376 R; 91/367
[58] Field of Search ..................... 303/9, 114.1, 114.3; 188/158, 151 A; 91/367, 376 R

[56] References Cited

U.S. PATENT DOCUMENTS

| | | |
|---|---|---|
| 2,819,031 | 1/1958 | Christensen ................................ 244/78 |
| 5,079,991 | 1/1992 | Cadeddu ................................ 91/376 R |
| 5,320,024 | 6/1994 | Wagner et al. ........................ 91/376 R |
| 5,367,942 | 11/1994 | Pasek ..................................... 91/376 R |
| 5,417,143 | 5/1995 | Pasek ..................................... 188/151 A |

Primary Examiner—Robert J. Oberleitner
Assistant Examiner—Robert A. Siconolfi
Attorney, Agent, or Firm—Christie, Parker & Hale, LLP

[57] ABSTRACT

An automatic emergency brake system for an automotive vehicle with an assistor having a backward push rod connected to a forward push rod coupled with a master cylinder's piston via a power piston and pushing the power piston so as to augment a force applied to a brake pedal by a driver, including a partition fixed to the backward push rod; a return spring disposed between the partition and a poppet; moving stoppers each having a moving rod, going in and out of a backward pushing rod housing, to support the back of the partition; an emergency spring disposed compressed between the moving stoppers and a housing end; a controller electrically connected to the moving stoppers to output a driving signal to the moving stoppers in accordance with a deceleration; and a deceleration/acceleration sensor electrically connected to the controller to input a reduced speed of the vehicle to the controller.

3 Claims, 2 Drawing Sheets

AUTOMATIC EMERGENCY BRAKE SYSTEM FOR AUTOMOTIVE VEHICLE

BACKGROUND OF THE INVENTION

1. Field of the Invention

The present invention relates to an automatic power brake system for an automotive vehicle. More particularly, it relates to an automatic emergency brake system for an automotive vehicle which goes into action without being controlled by a driver in the event of a collision and prevents additional accidents after the collision, thus assuring safety of passengers.

2. Discussion of Related Art

A hydraulic brake system for an automotive vehicle has an assistor for doubling manipulated variable utilizing intake negative pressure of a vehicle engine generated during running.

Referring to FIG. 1, a sectional view of main parts of a conventional hydraulic power brake system, the conventional hydraulic power brake system for an automotive vehicle includes a master cylinder 1; and an assistor 2 provided to master cylinder 1 for augmenting the force applied by an operator, and having a power cylinder 3, a power piston 5 installed in power cylinder 3 supported by a return spring 4, a forward push rod 6 connecting the forepart of power piston 5 with a piston 1-2 of master cylinder 1, and a backward push rod 8 supported by a return spring 7 and connecting the rear of power piston 5 with a brake pedal (not shown).

As a driver pushes down the brake pedal with his or her food to make the vehicle slow down or stop, backward push rod 8 is pushed to operate power piston 5 of assistor 2. Forward push rod 6 of assistor 2 pushes master cylinder 1 so that a brake fluid is furnished to a wheel cylinder, thus making the vehicle stop.

An automotive vehicle equipped with such a conventional hydraulic power brake system does not stop until its driver pushes down the brake pedal with his foot. In the event of a collision, if a driver fails to brake his or her car with an automatic transmission, which is in speed change mode as running mode, the car keeps going straight ahead without the driver's manipulating its accelerator, thus causing additional accidents. In case of an emergency such as a collision, when the driver fails to put on the brake and his or her car must be braked urgently, the conventional hydraulic power brake system cannot reduce or prevent accidents.

SUMMARY OF THE INVENTION

It is an objective of the present invention to provide an automatic emergency brake system for an automotive vehicle which goes into action without being controlled by a driver in the event of a collision, and reduces or prevents additional accidents after the collision.

In order to obtain the above-mentioned objective of the present invention, there is disclosed an automatic emergency brake system for an automotive vehicle with an assistor having a backward push rod connected to a forward push rod coupled with a master cylinder's piston via a power piston and pushing the power piston so as to augment a force applied to a brake pedal by a driver, including a partition fixed to the backward push rod; a return spring disposed between the partition and a poppet; moving stoppers each having a moving rod, going in and out of a backward pushing rod housing, to support the back of the partition; an emergency spring disposed compressed between the moving stoppers and a housing end; a controller electrically connected to the moving stoppers to output a driving signal to the moving stoppers in accordance with a deceleration; and a deceleration/acceleration sensor electrically connected to the controller to input a reduced speed of the vehicle to the controller.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

In the drawings:

FIG. 1 is a sectional view of main parts of a conventional hydraulic power brake system; and FIG. 2 is a sectional view of an automatic emergency brake system for an automotive vehicle in accordance with the present invention.

DETAILED DESCRIPTION OF PREFERRED EMBODIMENT

Figure 1:
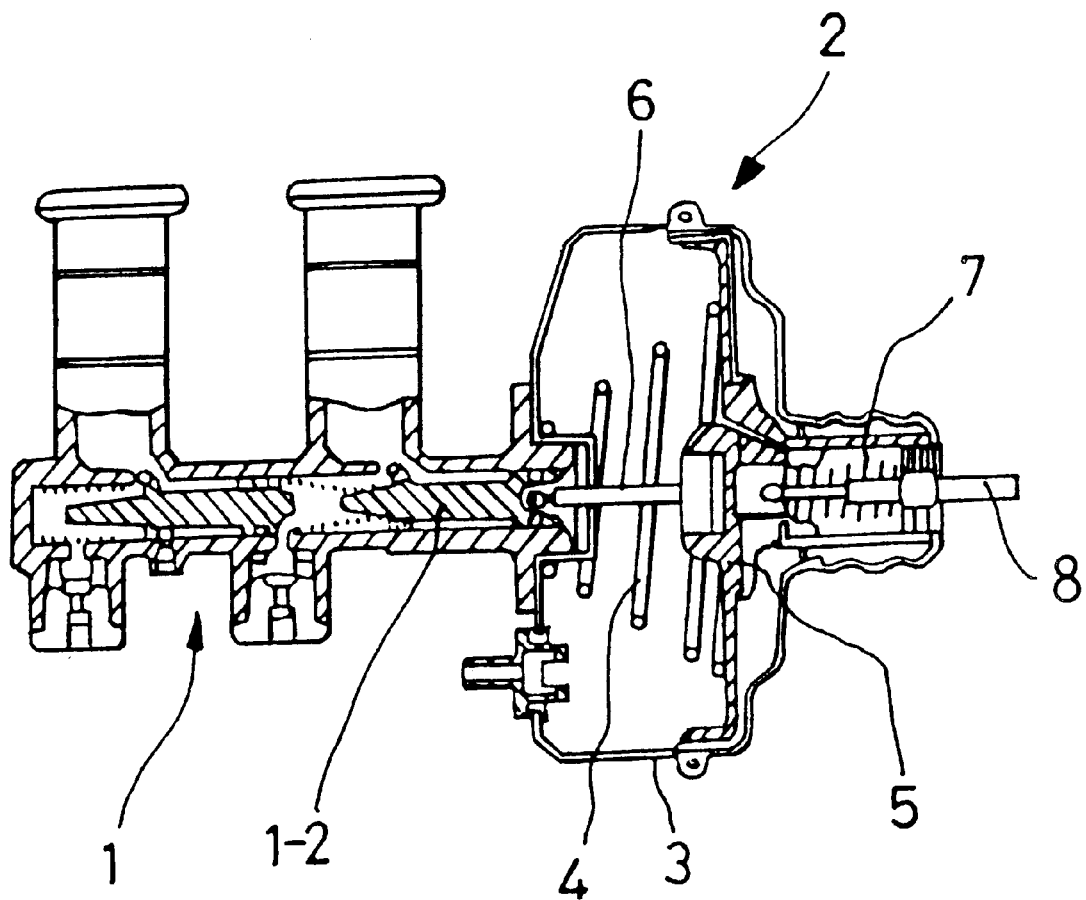

Reference will now be made in detail to the preferred embodiments of the present invention, examples of which are illustrated in the accompanying drawings. Similar reference numerals denote similar reference parts throughout the specification and drawings.

Figure 2:
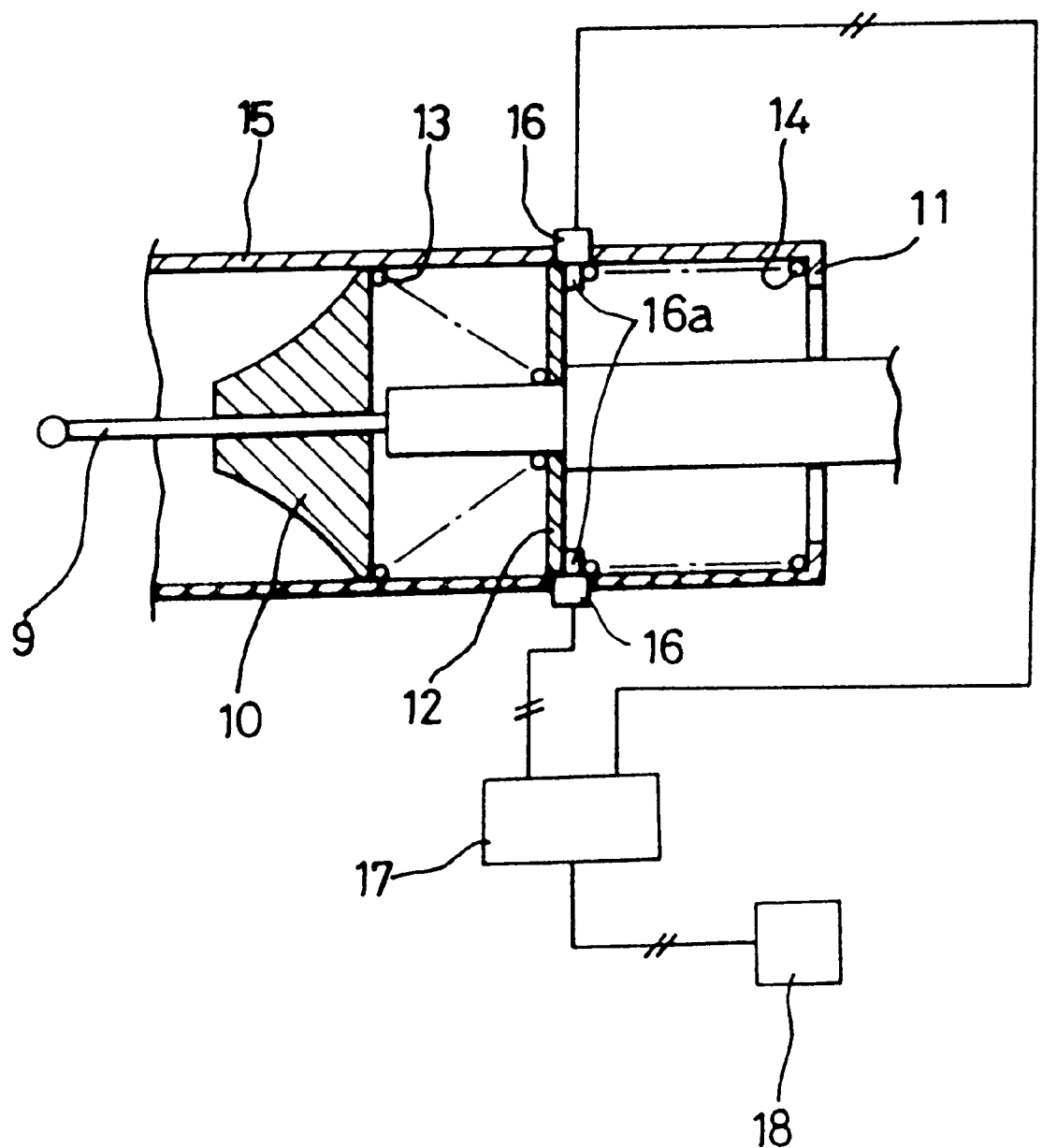

FIG. 2 is a sectional view of an automatic emergency brake system for an automotive vehicle in accordance with the present invention.

Reference numeral 9 denotes a backward push rod of a hydraulic power brake system, whose forepart is supported by a poppet 10 and rear part is held by a housing end 11. A partition 12 is fixedly interposed between poppet 10 and housing end 11. A return spring 13 is provided between poppet 10 and partition 12, and an emergency spring 14 with a spring constant higher than return spring 13's is compressed between housing end 11 and partition 12.

Emergency spring 14 is interposed between housing end 11 and partition 12 not to display resilience in normal state. A moving stopper 16 is provided to an upper or lower part of a backward push rod housing 15, or its both parts. Each of these moving stoppers 16 has a moving rod 16a fixedly supporting the front end of emergency spring 14, and protrudes toward the inside of backward push rod housing 15.

Each of moving rods 16a is realized as an electromagnet to go in and out of backward push rod housing 15 and be movable forward and backward within moving stopper 16. Moving stoppers 16 are electrically connected to a controller 17 which outputs a backward driving signal to each moving rod 16a if it determines that an acceleration/deceleration exceeds a preset point, utilizing a signal from an acceleration/deceleration sensor 18. This acceleration/deceleration sensor 18 is electrically connected to controller 17 for detecting the deceleration. The rear of each of partitions 12 is supported by all the front surface of respective moving rods 16a of moving stoppers 16 installed in backward push rod housing 15, and emergency spring 14 is supported by the back of respective moving rods 16a with its front end compressed.

The following description relates to the operation of the present invention.

In the case of a collision during driving, even if a driver fails to brake his car, acceleration/deceleration sensor 18 senses the reduced car speed and sends a signal to controller 17. Controller 17 receives the information of the reduced car speed, and outputs a backward driving signal to each moving rod 16*a* only if the deceleration exceeds a preset point.

Accordingly, each moving rod 16*a* of moving stoppers 16 receives the backward driving signal from controller 17 and moves backward in backward push rod housing 15. Emergency spring 14, compressed between moving rods 16*a* and housing end 11, restores to its original state and pushes partition 12 forward in accordance with the backward movement of moving rods 16*a*.

Since emergency spring 14 has the elasticity larger than return spring 13's, it pushes partition 12 overcoming return spring 13 to move backward push rod 9 forward in a manner that the car is brought to rest.

As described above, the inventive automatic emergency brake system is provided to an automotive vehicle to go into action and stop the automotive vehicle without being controlled by a driver in the event of a collision, thus reducing or preventing additional accidents after the collision.

It will be apparent to those skilled in the art that various modifications and variations can be made in the automatic emergency brake system for an automotive vehicle of the present invention without departing from the spirit or scope of the invention. Thus, it is intended that the present invention cover the modifications and variations of this invention provided they come within the scope of the appended claims and their equivalents.

What is claimed is:

1. In an assistor having a backward push rod connected to a forward push rod coupled with a master cylinder's piston via a power piston and pushing the power piston so as to augment a force applied to a brake pedal by a driver, an automatic emergency brake system for an automotive vehicle comprising:

a partition fixed to the backward push rod;

a return spring disposed between the partition and a poppet;

moving stoppers each having a moving rod, going in and out of a backward pushing rod housing, to support the back of the partition;

an emergency spring disposed compressed between the moving stoppers and a housing end;

control means electrically connected to the moving stoppers to output a driving signal to the moving stoppers in accordance with a deceleration; and a deceleration/acceleration sensor electrically connected to the control means to input a reduced speed of the vehicle to the control means.

2. An automatic emergency brake system for an automotive vehicle according to claim 1, wherein the emergency spring, compressed between the moving rod of the respective moving stoppers and housing end, has an elasticity larger than the return spring's installed between the poppet and partition.

3. An automatic emergency brake system for an automotive vehicle according to claim 1, wherein the moving stoppers fix a front end of the emergency spring so that the emergency spring is compressed between the partition and housing end.

* * * * *